US010375029B2

(12) United States Patent
Chen et al.

(10) Patent No.: US 10,375,029 B2
(45) Date of Patent: Aug. 6, 2019

(54) MULTIMEDIA BROADCASTING SYSTEM IN MULTIPLE NODE STRUCTURE AND MULTIMEDIA BROADCASTING CONTROL METHOD THEREOF

(71) Applicant: VIA TECHNOLOGIES, INC., New Taipei (TW)

(72) Inventors: Jia-Shiang Chen, New Taipei (TW); Chia-Wei Huang, New Taipei (TW); Shiang Steve Charng, New Taipei (TW); Chia-Sheng Kuo, New Taipei (TW); Cheng-Tao Tan, New Taipei (TW); Heng-Ho Wu, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 908 days.

(21) Appl. No.: 14/280,923

(22) Filed: May 19, 2014

(65) Prior Publication Data
US 2015/0006680 A1  Jan. 1, 2015

Related U.S. Application Data

(60) Provisional application No. 61/840,844, filed on Jun. 28, 2013.

(30) Foreign Application Priority Data

Feb. 11, 2014  (TW) .............................. 103104363 A

(51) Int. Cl.
*H04W 88/08* (2009.01)
*H04L 29/06* (2006.01)
(Continued)

(52) U.S. Cl.
CPC ...... *H04L 63/0428* (2013.01); *H04L 65/4076* (2013.01); *H04N 21/2225* (2013.01);
(Continued)

(58) Field of Classification Search
CPC ...................................................... H04L 41/509
(Continued)

(56) References Cited

U.S. PATENT DOCUMENTS 7,650,376 B1 *  1/2010  Blumenau ........... H04L 67/1008
                                                                 709/203
2005/0021622 A1 *  1/2005  Cullen ................... G06Q 30/02
                                                                 709/204

(Continued)

FOREIGN PATENT DOCUMENTS

CN          101026611          8/2007
CN      LA 101068186          11/2007
(Continued)

*Primary Examiner* — Hermon Asres
*Assistant Examiner* — Sibte H Bukhari
(74) *Attorney, Agent, or Firm* — McClure, Qualey & Rodack, LLP

(57) ABSTRACT

A multimedia broadcasting system having a multiple-node structure includes nodes. Each node is coupled to at least one of the nodes, and the nodes include server nodes and multimedia-playing terminal nodes. Each server node is coupled to at least one of the server nodes and provides at least one multimedia content. Each multimedia-playing terminal node receives multimedia content transmitted by a server node of the server nodes and plays the multimedia content. A first server node of the server nodes is coupled to a second server node of the server nodes, and the first server node transmits, via the second server node, a first multimedia content to at least one multimedia-playing terminal node controlled by the second server node. Each multimedia-playing terminal node is a multimedia play terminal including at least one display device or audio playing device.

12 Claims, 8 Drawing Sheets

(51) Int. Cl.
  *H04N 21/2225* (2011.01)
  *H04N 21/61* (2011.01)
  H04L 29/08 (2006.01)
  H04N 21/81 (2011.01)
  H04N 21/20 (2011.01)

(52) U.S. Cl.
  CPC ....... *H04N 21/6125* (2013.01); *H04L 67/288* (2013.01); *H04L 67/289* (2013.01); *H04N 21/812* (2013.01); *H04N 2021/225* (2013.01)

(58) Field of Classification Search
  USPC ........................................................ 709/219
  See application file for complete search history.

(56) References Cited

U.S. PATENT DOCUMENTS

| | | | | |
|---|---|---|---|---|
| 2007/0174471 | A1* | 7/2007 | Van Rossum | H04L 29/06 709/229 |
| 2008/0040453 | A1* | 2/2008 | Cohen | H04N 7/16 709/219 |
| 2009/0282160 | A1 | 11/2009 | Wang et al. | |
| 2011/0314293 | A1 | 12/2011 | Yu | |
| 2013/0308781 | A1* | 11/2013 | Kristiansson | H04L 63/104 380/270 |

FOREIGN PATENT DOCUMENTS

| | | |
|---|---|---|
| CN | 101877712 | 11/2010 |
| CN | 102117386 | 7/2011 |
| CN | 102291386 | 12/2011 |
| CN | 102868912 | 1/2013 |
| EP | 0 794 644 | 9/1997 |

\* cited by examiner

MULTIMEDIA BROADCASTING SYSTEM IN MULTIPLE NODE STRUCTURE AND MULTIMEDIA BROADCASTING CONTROL METHOD THEREOF

CROSS REFERENCE TO RELATED APPLICATIONS

This application claims priority of U.S. Provisional Patent Application No. 61/840,844, filed on Jun. 28, 2013, and Taiwan Patent Application No. 103104363, filed on Feb. 11, 2014, the entirety of which is incorporated by reference herein.

BACKGROUND OF THE INVENTION

Field of the Invention

The invention relates to a multimedia broadcasting system that disperses multimedia content and a control method thereof.

Description of the Related Art

As technologies have developed, nowadays there are a variety of terminal apparatuses capable of dispersing multimedia content, such as computers, televisions, tablets, etc. Digital signage, also known as a digital board, an electronic advertising billboard, multimedia signage, and so on, is often set up in department stores, at stations, and around other public places so as to provide multimedia content such as public-service information and advertisements and can be used to replace traditional print advertisements or information billboards. FIG. 1 illustrates a block diagram of a digital signage system according to the prior art. The digital signage system in FIG. 1 comprises a content management system server CMS, edge servers ES1, ES2, ES3, ES11, ES12 and ES13, and digital signage apparatuses APL1, APL2, APL3, APL4 and APL5. User terminals U1, U2 and U3 are connected to the content management system server CMS to transmit multimedia content to be dispersed to the content management system server CMS. The content management system server CMS controls multimedia transmissions and transmits the multimedia content to the digital signage apparatuses APL1, APL2, APL3, APL4 and APL5 directly or through the edge servers so as to make the digital signage apparatuses APL1, APL2, APL3, APL4 and APL5 play the multimedia content. Nevertheless, the traditional digital signage system mainly has problems that include difficulty in expansion, data security, application variety, etc. For example, as the coverage of the digital signage system expands, hardware requirements for servers may also increase. Accordingly, the existing server(s) may have to be replaced by new server(s), thereby causing difficulty in expansion. In addition, as the coverage of the digital signage system expands, the management and control of the digital signage system may also be difficult, thereby causing problems such as inefficiency in data transmission. Therefore, a multimedia broadcasting system that is equipped with a safe data-transmission mechanism, high expandability and high applicability and a control method thereof are needed.

BRIEF SUMMARY OF THE INVENTION

In view of the above, the invention provides a multimedia broadcasting system having a multiple-node structure, and safe data transmission mechanism, high expandability and high applicability of the multimedia broadcasting system can be achieved by controlling connection relationships among nodes, data transmission and management authority.

One embodiment of the invention provides a multimedia broadcasting system having a multiple-node structure. The multimedia broadcasting system having the multiple-node structure comprises a plurality of nodes. Each of the plurality of nodes is coupled to at least one other of node, and the plurality of nodes comprises a plurality of server nodes and a plurality of multimedia-playing terminal nodes. Each server node is coupled to at least one server node of the plurality of server nodes and provides at least one multimedia content. Each multimedia-playing terminal node receives multimedia content transmitted by a server node of the plurality of server nodes and plays the multimedia content. A first server node of the plurality of server nodes is coupled to a second server node of the plurality of server nodes, and the first server node transmits, via the second server node, a first multimedia content to at least one multimedia-playing terminal node controlled by the second server node. Each multimedia-playing terminal node is a multimedia-playing terminal comprising at least one display device or audio playing device.

Another embodiment of the invention provides a multimedia broadcasting control method applied to a multimedia broadcasting system having a multiple-node structure. The multimedia broadcasting system having the multiple-node structure comprises a plurality of nodes. Each of the plurality of nodes is coupled to at least one of the plurality of nodes. The plurality of nodes comprises a plurality of server nodes and a plurality of multimedia-playing terminal nodes. Each server node is coupled to at least one server node of the plurality of server nodes and provides at least one multimedia content, and each multimedia-playing terminal node receives multimedia content transmitted by a server node of the plurality of server nodes and plays the multimedia content. The multimedia broadcasting control method comprises: transmitting, by a first server node of the plurality of server nodes and via a second server node of the plurality of server nodes which is coupled to the first server node, a first multimedia content to at least one multimedia-playing terminal node controlled by the second server node to make the at least one multimedia-playing terminal node play the first multimedia content.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
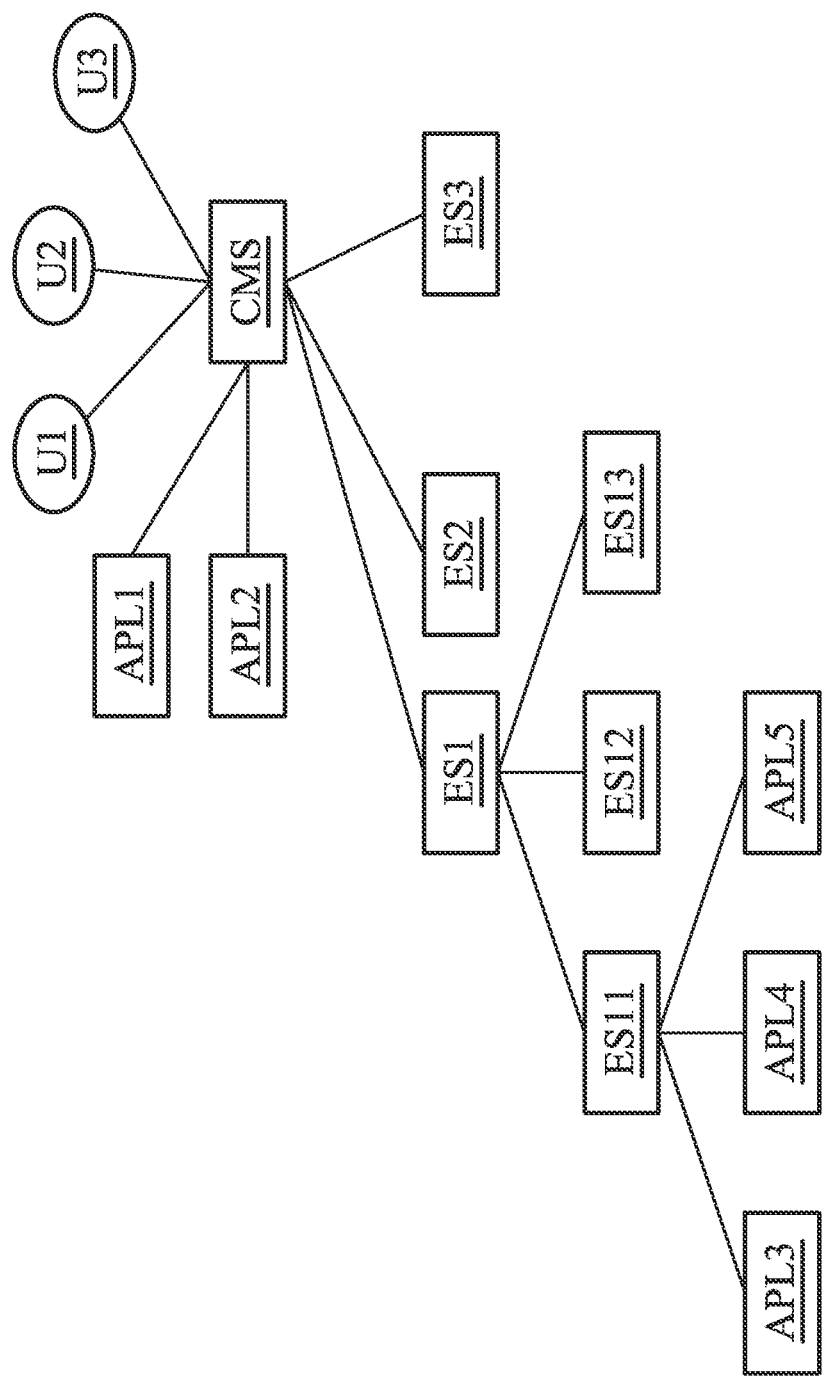
FIG. 1 illustrates a block diagram of a digital signage system according to the prior art.

The following description is of the best-contemplated mode of carrying out the invention. This description is made for the purpose of illustrating the general principles of the invention and should not be taken in a limiting sense. The scope of the invention is best determined by reference to the appended claims.

It is to be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

Figure 2:
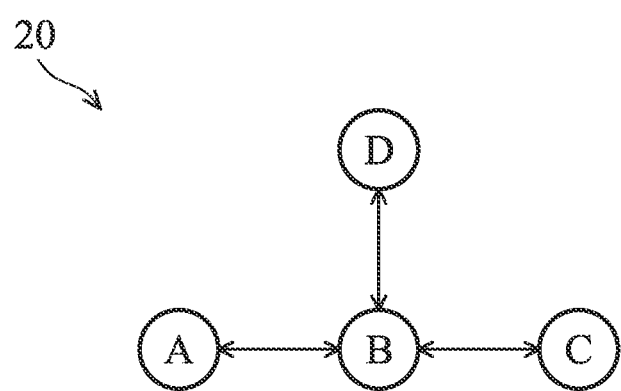
FIG. 2 illustrates a block diagram of a multimedia broadcasting system having a multiple-node structure according to an embodiment of the invention.

The invention provides a multimedia broadcasting system having a multiple-node structure. The multiple-node structure is first explained with reference to the embodiments in the following, and then the multimedia broadcasting system having the multiple-node structure is described. FIG. 2 illustrates a multiple-node structure 20 according to an embodiment of the invention. The multiple-node structure 20 comprises nodes A, B, C and D. Each node is connected to at least one another node. Each node provides at least one function or service. In the multiple-node structure of the invention, a node can transmit messages directly or through a transmission path established between the node and another node via other nodes. Message transmission among nodes can be performed in an encrypted way. When a node transmits a message, other nodes can be prevented from accessing or transmitting the message. A node can broadcast a message to some or all of nodes that are connected to the node or perform a group message transmission. When a node transmits a message to another node, the shortest transmission path can be determined based on the number of relaying nodes, transmission rate or/and transmission quality of each connection and so on, and the message is transmitted through the shortest transmission path. A node can search for another node that provides a specific function or service according to its node connection relationship table and transmits a request message to the node that provides the specific function or service to obtain the specific function or service. In addition, a node can control other nodes' authority to use the function or service provided by the node. Alternatively, a node can allow another node to be allowed to obtain some or all of the function or service provided by the node.

Messages can be transmitted among nodes based on a protocol. For example, protocol content may comprise a transmission source, a transmission target, an identifier and message content. The transmission source may comprise an identifier of a source node. Alternatively, the transmission source may comprise the identifier of the source node and a transmission path message. For example, the transmission path message may comprise identifiers of all the nodes that are passed through during the transmission. The transmission target may comprise an identifier of a target node or a target node group. To be noted, there may be more than one target node or more than one target node group. Each transmitted message has a corresponding and exclusive message identifier for identification. The message content can be multimedia content, data, instructions, keys, authority settings, and so on. The authority settings may comprise authority settings for accessing data, performing instructions, connecting to nodes, etc. Therefore, in the message transmission among the nodes, access authorities and transmission authorities of the nodes can be restricted. By controlling the transmission authorities of the nodes, the message transmission among the nodes can be achieved in a hierarchical way, a star-network way or a combination thereof.

Figure 3:
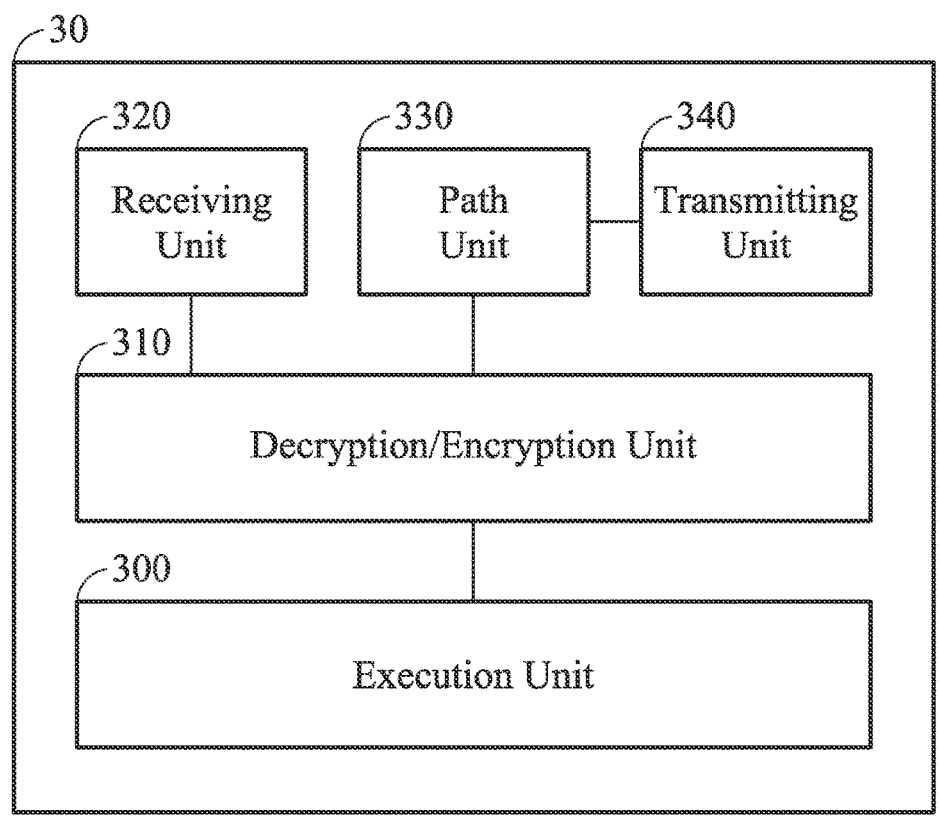
FIG. 3 illustrates a block diagram of a node according to an embodiment of the invention.

An exemplary configuration of a node in a multiple-node structure according to an embodiment of the invention is explained with reference to FIG. 3 in the following. FIG. 3 illustrates a block diagram of a node 30 according to an embodiment of the invention. The node 30 comprises an execution unit 300, a decryption/encryption unit 310, a receiving unit 320, a path unit 330 and a transmitting unit 340. The execution unit 300 performs the function or service of the node 30 and other operations. For example, if the node 30 is a node providing the function of playing multimedia, the execution unit 300 can be a multimedia processor for executing playback of multimedia content. The execution unit 300 can further generate or perform the protocol content described above. For example, if the message content received by the node 30 is an instruction, the execution unit 300 executes the operation instructed by the instruction. The receiving unit 320 receives a message that complies with the protocol described above from the source node and resolves the protocol content. The path unit 330 calculates the best path for transmitting a message to the target node based on the node connection relationship table of the node 30 and connection information. The transmitting unit 340 transmits the message complying with the protocol described above to the target node according to the best path calculated by the path unit 330. The decryption/encryption unit 310 performs decryption on the received protocol content based on the specific key between the node 30 and the source node or encryption on the to-be-transmitted protocol content based on the specific key between the node 30 and the target node. With regard to keys, keys may comprise a public key, a private key designated to perform one-way message transmission with the target node, a unique key designated to perform message transmission with the target node, a group key designated to perform message transmission with a plurality of target nodes, and so on. It should be noted that the node configuration in FIG. 3 is only exemplary and the invention is not limited thereto. For example, the node may further comprise a storage device for storing its node connection relationship table. In addition, some units of nodes may be omitted according to different functions or services provided by nodes.

Figure 4:
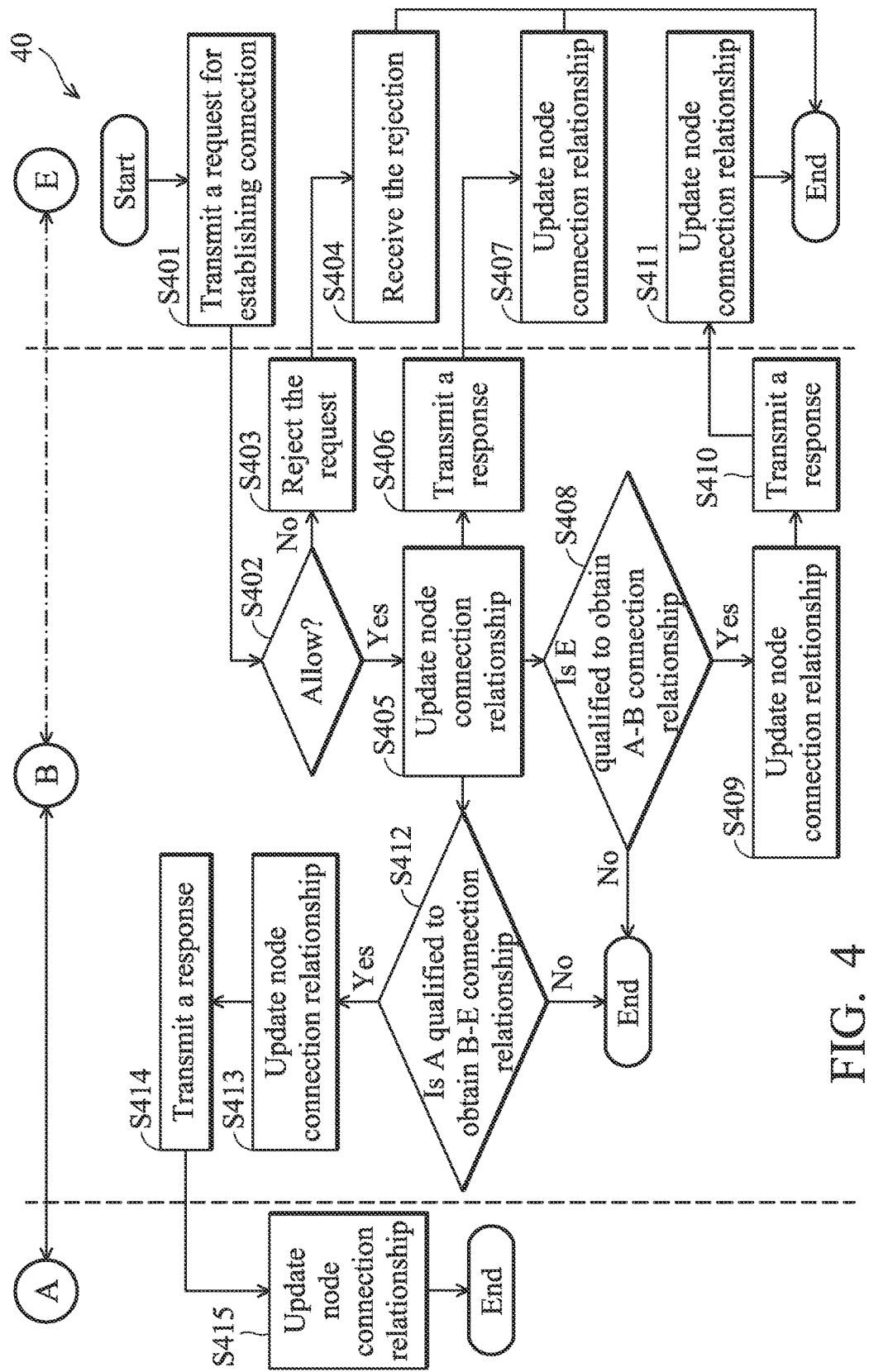
FIG. 4 illustrates a flowchart of a method for establishing node connection according to an embodiment of the invention.

FIG. 4 illustrates a flowchart of a method 40 for establishing node connection according to an embodiment of the invention. In the example as shown in FIG. 4, a new node E is going to be added into the multiple-node structure 20 in FIG. 2 so as to be connected to the node B in FIG. 2. As shown in FIG. 2, node B is already connected to the node A. First, in step S401, the node E transmits a request for establishing a connection. For example, the node E transmits a connection request to the node B. In step S402, when the node B receives the connection request from the node E, it is determined whether the connection request from the node E is allowed or not. If the connection request from the node E is not allowed (step S402: No), then, as shown in step S403, the node B transmits a response for rejecting the connection request to the node E. In step S404, the node E receives the response for rejecting the connection request from the node B and the connection establishment ends. If the connection request from the node E is allowed (step S402: Yes), then, as shown in step S405, the node B updates the node connection relationship table of the node B, that is, the node E is added into the node connection relationship table of the node B. In step S406, the node B transmits a response for granting the connection request to the node E, and then in step S407, the node E updates the node connection relationship table of the node E, that is, the node B is added into the node connection relationship table of the node E. In step S408, the node B determines whether the node E is qualified to obtain the connection relationship between the node A and the node B, that is, the node B determines whether the node E is allowed to be connected to the node A via the node B. If the node E is qualified to obtain the connection relationship between the node A and the node B (step S408: Yes), the node B updates the node connection relationship table of the node B (step S409) and transmits a response to the node E (step S410) to make the node E update the node connection relationship table of the node E (step S411). In step S412, the node B determines whether the node A is allowed to be connected to the node E via the node B. If the node A is allowed to be connected to the node E via the node B (step S412: Yes), the node B updates the node connection relationship table of the node B (step S413) and transmits a response to the node A (step S414) to make the node A update the node connection relationship table of the node A (step S415). In the steps S408 and S412 described above, the node B may determine whether the node A or the node E is qualified to obtain the connection relationship through a security authentication mechanism. If the node E successfully establishes the connection with the node B, then the nodes A~E form the multiple-node structure 50 shown in FIG. 5.

Figure 6:
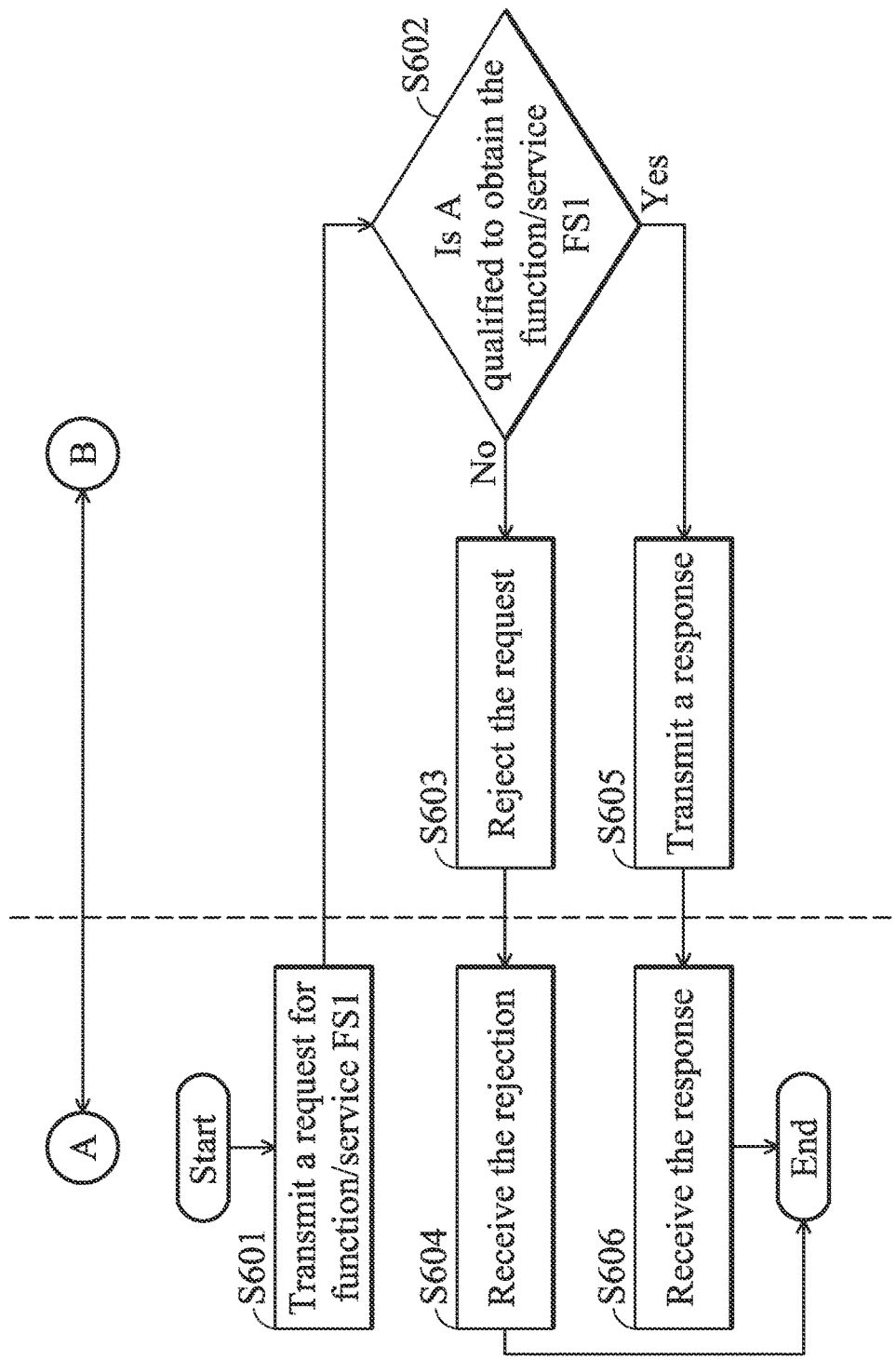
FIG. 6 illustrates a flowchart of a method for requesting a function or service according to an embodiment of the invention.

FIG. 6 illustrates a flowchart of a method 60 for requesting a function or service FS1 according to an embodiment of the invention. In the example as shown in FIG. 6, the node A which is already connected to the node B is going to transmit a request for the function or service FS1 provided by the node B. In step S601, the node A transmits a message for requesting the function or service FS1 to the node B. In step S602, after the node B receives the message for requesting the function or service FS1 transmitted by the node A, the node B determines whether the node A is qualified to obtain the function or service FS1. For example, the node B determines whether the node A is qualified to obtain the function or service FS1 through a secure authentication mechanism. If the node A is not qualified to obtain the function or service FS1 (step S602: No), the node B transmit a response for rejecting the request for the function or service FS1 (step S604) and then the method 60 ends. In another example, after the node A receives the response for rejecting the request for the function or service FS1, the node A searches for another node that provides the function or service FS1 according to the node connection relationship table of the node A and transmits a request for the function or service FS1 to the another node. If node A is qualified to obtain the function or service FS1 (step S602: Yes), the node B transmits a response for accepting the request for the function or service FS1 to the node A (step S605). The node A receives the response for accepting the request for the function or service FS1 (step S606). After the node A receives the response for accepting the request for the function or service FS1, the node A can directly obtain the function or service FS1 provided by the node B. Alternatively, the node A can obtain the function or service FS1 provided by the node B in a way indicated by the response received in step S606. A request for a function or service comprises a request for sharing the function or service, a request for monopolizing the function or service, and so on. If a first node transmits a request for monopolizing a function or service to a second node and the request for monopolizing the function or service is accepted by the second node, the second node is not able to provide the function or service to any other node.

According to an embodiment of the invention, the multimedia broadcasting system having the multiple-node structure may at least comprise a server node, a relay node and a multimedia-playing terminal node. Methods for establishing node connection and requesting function or service of the server node, the relay node and the multimedia-playing terminal node are similar to the method 40 for establishing node connection and the method 60 for requesting function or service described above and will not be described again for brevity and clarity. A server node provides functions of issuing, editing and modifying multimedia content. In addition, the server node provides a server function to transmit the multimedia content at least one multimedia-playing terminal node so as the make the at least one multimedia-playing terminal node ply the multimedia content and control transmission and playing of the multimedia content. The server node can be a computer comprising at least a processor and a storage device. The relay node provide a transmission relay function to further transmit the multimedia content from the server node to the target multimedia-playing terminal node or temporarily store the multimedia content from the server node. Moreover, the relay node may transmit a message from the server node to the target server node or store the message from the server node. Similarly, the relay node can be computer comprising at least a processor and a storage device. A multimedia-playing terminal node can be a multimedia-playing terminal, such as a digital signage, a television wall system, an interactive operating system, and so on. The multimedia-playing terminal node provides a function of playing multimedia content. The multimedia-playing terminal node can receive and play a multimedia file from the server node. Alternatively, the multimedia-playing terminal node can request another node in the multiple-node structure to provide a specific function or service to the multimedia-playing terminal node and then play the specific function or service. How the multimedia-playing terminal node requests another node in the multiple-node structure to provide a specific function or service to the multimedia-playing terminal node will be explained in the following.

Figure 5:
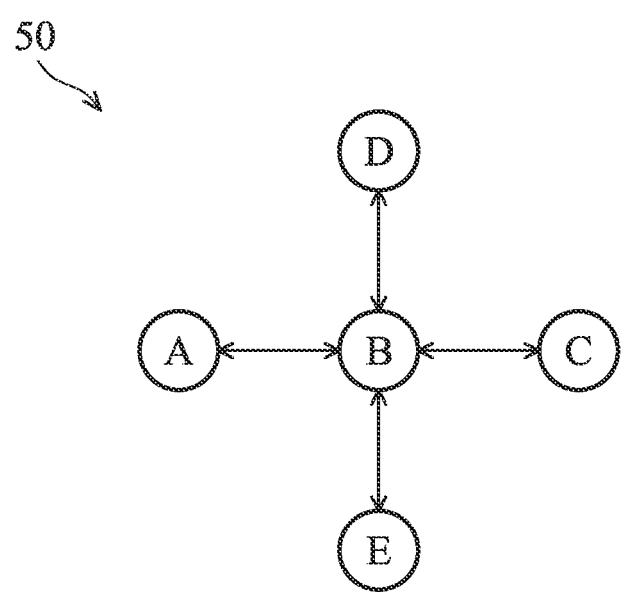
FIG. 5 illustrates a block diagram of a multiple-node structure according to an embodiment of the invention.
Figure 7:
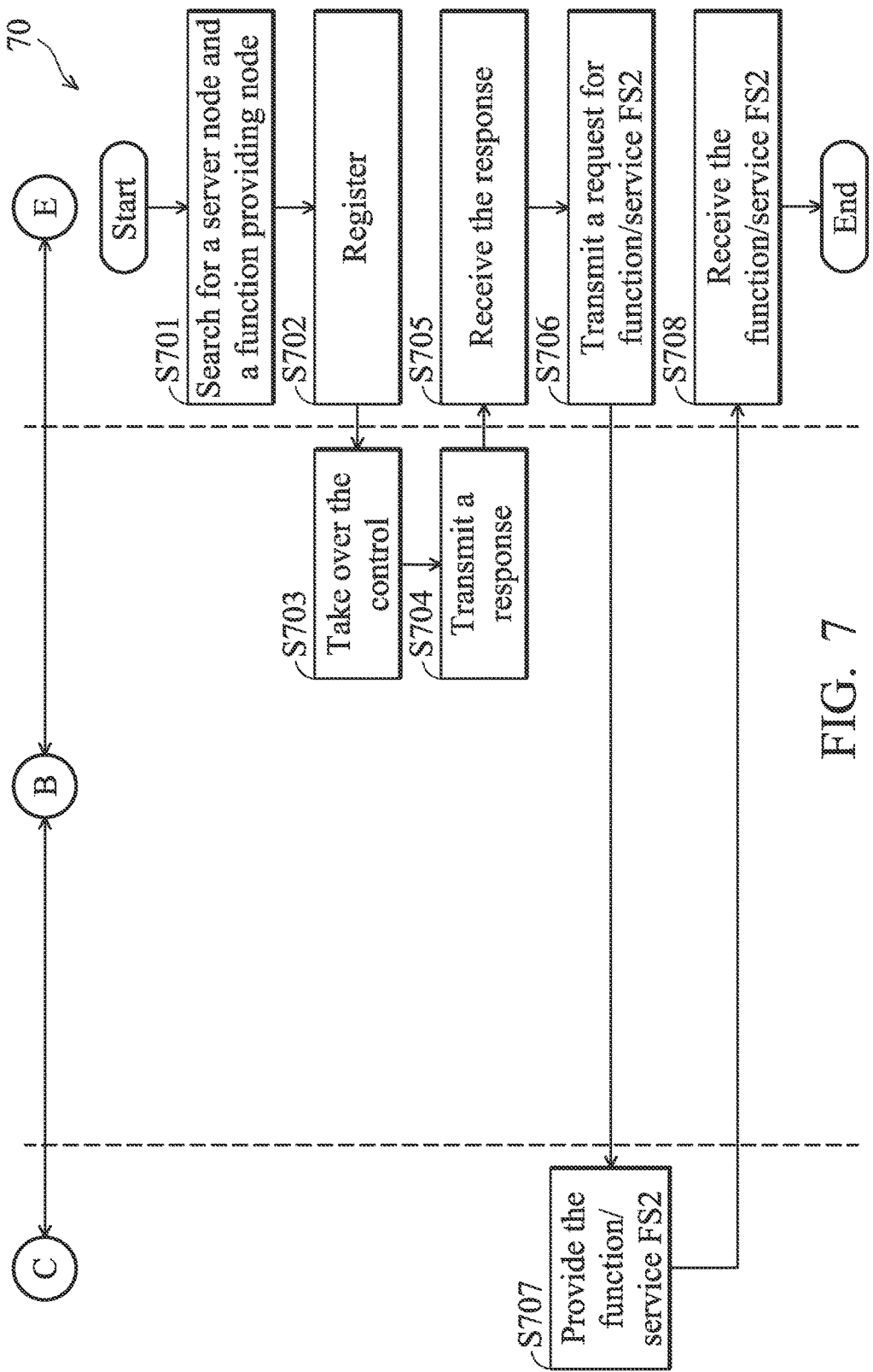
FIG. 7 illustrates a flowchart of a method for requesting a function or service by a newly-added multimedia-playing terminal node according to an embodiment of the invention.

FIG. 7 illustrates a flowchart of a method 70 for requesting a function or service FS2 by a newly added multimedia-playing terminal node according to an embodiment of the invention. Here, the multimedia broadcasting system having the multiple-node structure 50 in FIG. 5 is used to explain the method 70. The node B is a server node, the node A is a multimedia-playing terminal which register itself to the server node B. The nodes C and D are nodes that provide a specific function or service. The node E is a multimedia-playing terminal node which is newly added into the multiple-node structure 50 and connected to the server node B. For example, the node E establishes the connection with the server node B through the method 40 for establishing node connection shown in FIG. 4 and is qualified to be connected to the nodes C and D via the node B after the node connection establishment. In step S701, the multimedia-playing terminal E searches for the closest server node and a node providing a specific function or service according to the node connection relationship table of the multimedia-playing terminal node E. In this example, according to the node connection relationship table of the multimedia-playing terminal node E, the multimedia-playing terminal node E may obtain that the server node B is the closest node and that the node C provides the specific function or service FS2 that the multimedia-playing terminal node E requests. In step S702, the multimedia-playing terminal node E transmits a register request to the server node B to request being registered to the server node B and then controlled by the server node B. In step S703, the server node B receives the register request from the multimedia-playing terminal node E and takes control over the multimedia-playing terminal node E. Then, in step S704, the server node B transmits a response for accepting the register request to the multimedia-playing terminal node E. The multimedia-playing terminal node E receives the response and accepts being controlled by the server node B. In step S706, the multimedia-playing terminal node E transmits a request for the function or service FS2 to the node C. Then, in step S707, after the node C accepts the request for the function or service FS2 transmitted from the multimedia-playing terminal node E, the node C provides the function or service FS2 to the multimedia-playing terminal node E. After that, in step S708, the multimedia-playing terminal node E receives the function or service FS2 provided by the node C. For example, the multimedia-playing terminal node E transmits a request for weather information service and the node C is a node that is able to provide weather information service. Therefore, in step S708, the multimedia-playing terminal node E can obtain weather information from the node C and then play the weather information.

In on example, if the node C can not function normally, for example, if there is no response transmitted from the node C after a predetermined period of time from transmitting the request in step S706, the multimedia-playing terminal node E searches for another node that provides the function or service FS2 according to the node connection relationship table of the multimedia-playing terminal node E and transmitting a request as in step S706 to this node.

FIG. 7 illustrates the method for requesting a function or service by a multimedia-playing terminal node that is newly added into the multimedia broadcasting system having the multiple-node structure. Nevertheless, for those multimedia-playing terminal nodes that are already existed in the multimedia broadcasting system having the multiple-node structure, steps S701~S705 can be omitted. That is, a multimedia-playing terminal node that is already existed in the multimedia broadcasting system having the multiple-node structure can directly searches for a node that provides the function or service FS2 according to its node connection relationship table and then performs steps S706~S708.

In the disclosure, a node connection relationship table of a node comprises nodes that the node is able to be connected to, a function or service provided by each of the nodes, a possible path/possible paths to each of the nodes, message transmission rate and quality of the connection between the node and each of the nodes, and so on.

Figure 8:
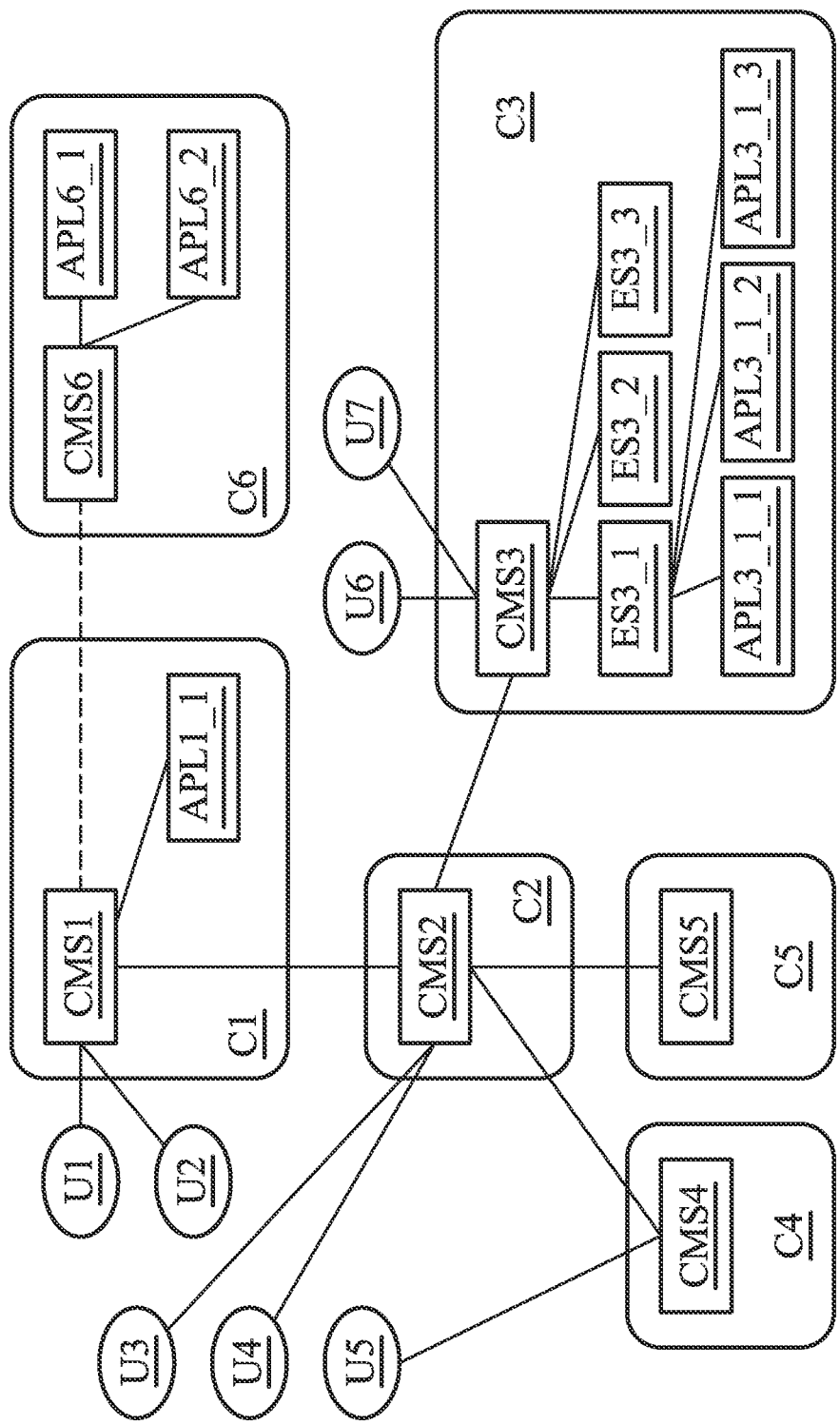
FIG. 8 illustrates a block diagram of a multimedia broadcasting system having a multiple-node structure according to an embodiment of the invention.

FIG. 8 illustrates a block diagram of a multimedia broadcasting system having a multiple-node structure according to an embodiment of the invention. The multimedia broadcasting system having the multiple-node structure (hereinafter referred to as multimedia broadcasting system) comprises server nodes CMS1~CMS6, relay nodes ES3_1~ES3_3, and multimedia-playing terminal nodes APL1_1, APL3_1_1~APL3_1_3, APL6_1 and APL6_2. Users U1~U6 are separately connected to the server nodes CMS1~CMS6 to provide to-be-played multimedia content to the server nodes CMS1~CMS6. In FIG. 8, C1~C6 represent different groups. Each group comprises at least one server node. For example, the group C3 comprises all nodes in the same building. Compared with the prior art, in the multimedia broadcasting system of the embodiment, a server node can be directly connected to another server node so as to share resources with another server node, take partial or entire control over another node, or assist in transmitting messages from another server node. A server node can take partial or entire control over another server node through a method similar to the method in FIG. 6. It should be noted that in FIG. 8, messages are transmitted among nodes in a way which is the same as described above. A node can calculate the best path between the node and a target node according to its node connection relationship table. A node can use different keys according to different transmission requirements. For example, when the server node CMS3 is going to transmit messages to all nodes in the group C3, a group key can be used. By setting keys, messages can be transmitted through some nodes but only able to be accessed by specific nodes.

A multimedia-playing terminal node in FIG. 8 can receive multimedia content from the server nodes and then play the received multimedia content. In addition, the multimedia-playing terminal node can transmit a request for a specific function or service, such as weather information service, traffic information service, and so on, to a node that provides the specific function or service in a way similar to the method in FIG. 6 so as to obtain the specific function or service and then play the specific function or service. Since the multimedia-playing terminal node not only passively plays received multimedia content but also actively requests other specific function or server, the multimedia-playing terminal node can be a multimedia-playing terminal having the interaction function.

In the multimedia broadcasting system of FIG. 8, the connection between the server nodes CMS1 and CMS2 already exists. It is assumed that the group C6 is newly added into the multimedia broadcasting system, and a method for adding the group C6 into the multimedia broadcasting system, which is similar to the method in FIG. 4, will be described in the following. First, the address, such as the IP address, of the server node CMS1 that the server node CMS6 of the group C6 is going to be connected to is set to the server node CMS6 (for example, the address of the server node CMS1 is added into the node connection relationship table of the server node CMS6). The server node CMS6 transmits a message for requesting connection to the server node CMS1. After the server node CMS1 receives the message for requesting connection, the server node CMS1 adds the server node CMS6 into the node connection relationship table of the server node CMS1 and transmits the updated node connection relationship table to the server node CMS6 so as to make the server node CMS6 obtain the node connection relationship table of the server node CMS1 and capability of communication with all server nodes. In addition, the server node CMS1 transmits a message for updating node connection relationship table to other server nodes, such as the server node CMS2, so as to make other server nodes that are connected to the server node CMS1 update the server node CMS6 into their node connection relationship tables. As described above, all node in the group C6 can be easily added into the multimedia broadcasting system, the multimedia broadcasting system may comprise groups having different structures simultaneously, and the equipment cost and time cost the multimedia broadcasting system takes for expansion are much less than that of prior art.

The server node CMS2 and the server node CMS 3 are used as an example to explain how a server node takes control over multimedia-playing terminal nodes controlled by another server node. First, the server node CMS2 transmits a message for requesting a list of multimedia-playing terminal nodes in the group C3 to the server node CMS3. The server node CMS3 transmits the list of multimedia-playing terminal nodes in the group C3 (including identifiers of all multimedia-playing terminal nodes in the group C3) to the server node CMS2 in response. Then, the server node CMS2 determines which multimedia-playing terminal nodes the server node CMS2 is going to control according to the list of multimedia-playing terminal nodes in the group C3 and transmits a message for requesting taking control over multimedia-playing terminal nodes to the server node CMS3. The message for taking control over multimedia-playing terminal nodes comprises identifiers of the multimedia-playing terminal nodes the server node CMS2 is going to control, which functions of the multimedia-playing terminal nodes the server node CMS2 is going to control, time intervals for controlling, and so on. After the server node CMS3 receives the message for requesting taking control over multimedia-playing terminal nodes, the server node CMS3 transmits a list of multimedia-playing terminal nodes that are allowed to be controlled by the server node CMS2 to the server node CMS2 in response. The list of the multimedia-playing terminal nodes that are allowed to be controlled by the server node CMS2 comprises identifiers of the multimedia-playing terminal nodes that are allowed to be controlled by the server node CMS2, functions that are allowed to be controlled, time intervals that are allowed to be controlled, and so on. After receiving the list of the multimedia-playing terminal nodes that are allowed to be controlled by the server node CMS2, the server node CMS2 takes partial or entire control over some or all of multimedia-playing terminal nodes in the group C3 which are indicated in the list of the multimedia-playing terminal nodes that are allowed to be controlled by the server node CMS2. In other words, the server node CMS2 can control message transmission between the server node CMS2 and the multimedia-playing terminal nodes in the group C3 that can be controlled by the server node CMS2. In addition, the server node CMS2 can transmit multimedia content to the multimedia-playing terminal nodes in the group C3 that can be controlled by the server node CMS2 to make the multimedia-playing terminal nodes in the group C3 that can be controlled by the server node CMS2 play the multimedia content. A method for transmitting multimedia content to some or all of multimedia-playing terminal nodes in the group C3 via the server node CMS after the server node CMS2 takes control over some or all of multimedia-playing terminal nodes in the group C3 will be described in the following.

It is assumed that the server node CMS2 takes control over the multimedia-playing terminal nodes APL3_1_1~APL3_1_3 in the group C3. First, the server node CMS3 determines that the relay node which the multimedia-playing terminal nodes APL3_1_1~APL3_1_3 are connected to is the node ES31. The server node CMS2 transmits multimedia content to the server node CMS3. The server node CMS3 temporarily stores the multimedia content in the relay node ES3_1. Then, the server node CMS2 transmits a playing list to the server node CMS3. The server node CMS3 transmits the playing list to the multimedia-playing terminal nodes APL3_1_1~APL3_1_3. After the multimedia-playing terminal nodes APL3_1_1~APL3_1_3 receive the playing list, if the multimedia-playing terminal nodes APL3_1_1~APL3_1_3 are included in the playing list, the multimedia-playing terminal nodes APL3_1_1~APL3_1_3 will download the multimedia content from the relay node ES3_1 and play the multimedia content.

After the multimedia-playing terminal nodes APL3_1_1~APL3_1_3 play the multimedia content, the multimedia-playing terminal nodes APL3_1_1~APL3_1_3 will report a playing record. The multimedia-playing terminal nodes APL3_1_1~APL3_1_3 transmit the playing record to the relay node ES3_1 first, and then, according to settings of the server node CMS3, the replay node ES3_1 may transmit the playing record back to the serer node CMS3, or, the replay node ES3_1 may not transmit the playing record back to the server node CMS3 but store the playing record in the replay node ES3_1. For example, according to the settings of the server node CMS3, the repay node ES3_1 doesn't need to transmit the playing record back to the server node CMS3 if the playing record indicates that the multimedia content is successfully played, and the server node CMS3 does transmit the playing record back to the server node CMS3 if the playing record indicates that the playing of the multimedia content is failed. If the replay node ES3_1 doesn't transmit playing record back to the server node CMS3 and stores the playing record in the relay node ES3_1, the server node may access the playing record stored in the relay node ES3_1 according to its requirements. In another example, after the multimedia-playing terminal transmit the playing record to the server node CMS3, the server node CMS3 can determine whether to transmit the playing record back to the server node CMS2 according to the playing record. For example, if the playing record indicates that the multimedia content is successfully played by the multimedia-playing terminal node, the server node CMS3 doesn't need to transmit the playing record back to the server node CMS2. If the playing record indicated that the playing of the multimedia content is failed, the server node CMS3 transmits the playing record back to the server node CMS2.

In the embodiment described above, a relationship similar to the master-slave relationship is formed between the server node CMS2 and the server node CMS3. Nevertheless, in the multimedia broadcasting system of the invention, the relationship similar to the master-slave relationship can be dynamically adjusted according to different application or requirements. For example, functions of a node can be partially or fully opened to other nodes. Alternatively, a node may take control over a plurality of nodes based on different environments where the multimedia broadcasting system is applied.

Similar to the playing record as described above, a booting message of a multimedia-playing terminal node can be kept by a corresponding relay node or server node, Take FIG. 8 as an example, the multimedia-playing terminal node APL3_1_1 is automatically turned on at a predetermined time. The multimedia-playing terminal node APL3_1_1 obtains that the relay node the multimedia-playing terminal node APL3_1_1 is connected to is the relay node ES3_1 according to its node connection relationship table. Therefore, the multimedia-playing terminal node APL3_1_1 transmits its booting message to the relay node ES3_1. After the relay node ES3_1 receives the booting message, the relay node ES3_1 obtains that the server node the relay node ES3_1 is connected to is the server node CMS3 according to its node connection relationship table. The repay node Es3_1 determines whether to transmit the booting message to the server node CMS3 based on whether the booting message records success or failure. The server node CMS3 can also determine whether transmit the booting message to other server nodes based on whether the booting message records success or failure. Regarding the description of the playing record and the booting message, in the multimedia broadcasting system of the invention, a server node is not necessary to store all messages from a multimedia-playing terminal node. Accordingly, hardware requirements for a server are relatively small. In addition, the network load of the server is also smaller, and thus the server doesn't have to deal with a large amount of message transmission.

According to the multimedia broadcasting system in FIG. 8, local multimedia content regarding an area can be transmitted by the closest server node to reduce network and hardware loads of irrelevant groups. Foe example, the user U6 or U7 transmits local multimedia content regarding an area which the multimedia-playing terminal nodes APL3_1_1~APL3_1_3 need to the server node CMS3. The server node CMS3 transmits the local multimedia content to the relay node ES3_1. The relay node ES3_1 transmits the local multimedia content to the multimedia-playing terminal nodes APL3_1_1~APL3_1_3. It can be set that only the multimedia-playing terminal nodes in the area are able to access the local multimedia content by setting the key.

It should be noted that transmission of multimedia content, message and so on as described above has to comply with the transmission protocol described above. A method for transmitting content with a high security level in the multimedia broadcasting system of the invention will be described with reference to FIG. 8 in the following. In one example, after the multimedia-playing terminal node APL3_1_1 plays an advertisement, the multimedia-playing terminal node APL3_1_1 sets a private key in a message including a playing record of the advertisement, the target node is set to the server node CMS1, and the message is encrypted using the private key. Then the multimedia-playing terminal node APL3_1_1 transmits the message to the relay node ES3_1. The relay node ES3_1 obtains that the target node is the server node CMS1 according to the identifier of the target node included in the message. Therefore, the relay node ES3_1 transmits the message to the server node CMS3 according to the relay node ES3_1's node connection relationship table. After the server node CMS3 receives the message, the server node CSM3 obtains that the target node is the server node CMS1 according to the identifier of the target node included in the message. Then, the server node CMS3 transmits the message to the server node CMS2 according to the server node CMS3's node connection relationship table. After the server node CMS2 receives the message, the server node CSM2 obtains that the target node is the server node CMS1 according to the identifier of the target node included in the message. Then, the server node CMS2 transmits the message to the server node CMS1 according to the server node CMS2's node connection relationship table. After the server node CMS1 receives the message, the server node CMS1 decrypts the message using the private key provided by the multimedia-playing terminal node APL3_1_1 to obtain the playing record of the advertisement. If the server nodes CMS2 and CMS3 both possess the private key provided by the multimedia-playing terminal node APL3_1_1, then the server nodes CMS2 and CMS3 can decrypt the message to obtain the playing record of the advertisement. Since the relay node ES3_1 doesn't possess the private key provided by the multimedia-playing terminal node APL3_1_1, the relay node ES3_1 is not able to decrypt the message to obtain the playing record of the advertisement. In another example, after the multimedia-playing terminal node APL3_1_1 plays the advertisement, the multimedia-playing terminal node APL3_1_1 is going to transmit the playing record of the advertisement to the server node CMS3 but doesn't want any other node to access the playing record of the advertisement. Therefore, the multimedia-playing terminal node APL3_1_1 sets a unique key designated to the server node CMS3 in a message including the playing record of the advertisement, the target node is set to the server node CMS3, and the message is encrypted using the unique key. Then the multimedia-playing terminal node APL3_1_1 transmits the message to the relay node ES3_1. The relay node ES3_1 obtains that the target node is the server node CMS3 according to the identifier of the target node included in the message. Therefore, the relay node ES3_1 transmits the message to the server node CMS3 according to the relay node ES3_1's node connection relationship table. After the server node CMS3 receives the message, the server node CSM3 decrypts the message using the unique key provided by the multimedia-playing terminal node APL3_1_1 to obtain the playing record of the advertisement. As described above, by setting a public key, a private key, a unique key, and so on, messages with different requirements can be encrypted by corresponding appropriate keys to achieve safe transmission.

According to the multimedia broadcasting system having the multiple-node structure described in the above embodiments, by limiting nodes to transmitting a message and nodes to access the transmitted message, transmission in a hierarchy substructure and transmission in a star substructure can be achieved. Therefore, the multimedia broadcasting system having the multiple-node structure can be applied to different application environments and a complicated network structure. Furthermore, there can be different types of substructures in the multimedia broadcasting system having the multiple-node structure, and thus the incompatibility in substructures occurred when expanding the multimedia broadcasting system won't happen. In addition, by setting appropriately, functions of each node in the multimedia broadcasting system having the multiple-node structure can be partially or fully opened to other nodes. Moreover, according to the protocol content and settings of the keys, there is a safe mechanism for message transmission among nodes. Therefore, content of the transmitted message can be protected and the safe mechanism can comply with existing safe transmission mechanisms. A plurality of transmission types, such as group transmission, transmission to a particular target, and so on, can be achieved according to the protocol content and settings of the keys. Moreover, a multimedia-playing terminal node can request a specific function or service from a node that provides the specific function or service, and thus a function connection or a service connection can be easily established. According the multimedia broadcasting system having the multiple-node structure and the controlling method thereof as described above, the multimedia broadcasting system of the invention has high capability in expansion, a new multimedia-playing terminal, such as a television, a interactive multimedia playing apparatus, and so on, is easily to be added into the multimedia broadcasting system of the invention, and an existing multimedia broadcasting subsystem (for example, the groups in FIG. 8) is also easily to be added into the multimedia broadcasting system of the invention. Since each server node can share its control of multimedia-playing terminal nodes with another node or be taken partial or entire control by another node, the management of nodes will not be excessively concentrated on some server nodes, thereby avoiding problems such as low efficiency in multimedia broadcast.

Methods and apparatus of the present disclosure, or certain aspects or portions of embodiments thereof, may take the form of a program code (i.e., instructions) embodied in media, such as floppy diskettes, CD-ROMS, hard drives, firmware, or any other non-transitory machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing an embodiment of the disclosure. When implemented on a general-purpose processor, the program code combines with the processor to provide a unique apparatus that operates analogously to specific logic circuits.

While the invention has been described by way of example and in terms of preferred embodiments, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multimedia broadcasting system having a multiple-node structure, comprising:
a plurality of nodes, wherein each of the plurality of nodes is coupled to at least one of the plurality of nodes, and the plurality of nodes comprises:
a plurality of server nodes, wherein each server node is coupled to at least one server node of the plurality of server nodes and provides at least one multimedia content, wherein the server nodes coupled with each other share resources with each other and take partial or entire control of each other; and
a plurality of multimedia-playing terminal nodes, wherein each multimedia-playing terminal node receives multimedia content transmitted by a server node of the plurality of server nodes and plays the multimedia content,
wherein a first server node of the plurality of server nodes is coupled to a second server node of the plurality of server nodes, the first server node transmits, via the second server node, a first multimedia content to at least one multimedia-playing terminal node controlled by the second server node,
wherein each multimedia-playing terminal node is a multimedia-playing terminal comprising at least one display device or audio playing device,
wherein a message transmitted among the plurality of nodes is transmitted by complying with a transmission protocol, wherein the transmission protocol comprises a key, a transmission source, a transmission target, an identifier and message content, and the message is encrypted using the key, and
wherein the message comprises authority settings to limit nodes which are able to access the message and nodes which are able to transmit the message, so as to achieve different transmission structures,
wherein each node calculates a best path between the node and a target node according to a node connection relationship table of the node, sets the key, and the message is transmitted through the best path, along with the key,
wherein the multimedia broadcasting system having the multiple-node structure comprises at least one group, each of the at least one group comprises at least one server node of the plurality of server nodes, wherein when a group is newly added into the multimedia broadcasting system having the multiple-node structure, an address of a third server node of the plurality of server nodes is set to a node connection relationship table of a server node of the group, the server node of the group transmits a request for a node connection relationship table to the third server node, and the third server node transmits a node connection relationship table of the third server to the server node of the group to make the server node of the group obtain capability of communication with the plurality of server nodes.

2. The multimedia broadcasting system having the multiple-node structure as claimed in claim 1, wherein the first server node transmits a request for multimedia-playing terminal list to the second server node to obtain a list of a plurality of multimedia-playing terminal nodes controlled by the second server node, the first server node transmits a request for taking control over multimedia-playing terminal nodes to the second server node according to the list and takes control over the at least one multimedia-playing terminal node controlled by the second server node according to a response from the second server.

3. The multimedia broadcasting system having the multiple-node structure as claimed in claim 1, wherein when a multimedia-playing terminal node is added into the multimedia broadcasting system having the multiple-node structure, the multimedia-playing terminal node searches for a third server node of the plurality of server nodes which is the closest to the multimedia-playing terminal node in the multimedia broadcasting system having the multiple-node structure according to a node connection relationship table of the multimedia-playing terminal node and registers itself to the third server node to be controlled by the third server node.

4. The multimedia broadcasting system having the multiple-node structure as claimed in claim 1, wherein a multimedia-playing terminal node of the plurality of multimedia-playing terminal nodes searches for a node among the plurality of nodes which provides a specific function or service according to a node connection relationship table of the multimedia-playing terminal node and transmits a request for the specific function or service to the node to play multimedia content of the specific function or service.

5. The multimedia broadcasting system having the multiple-node structure as claimed in claim 1, wherein the plurality of nodes further comprise at least one relay node, the at least one relay node is coupled to a server node of the plurality of server nodes and at least two multimedia-playing terminal nodes of the plurality of multimedia-playing terminal nodes, and the at least one relay node relays or temporarily stores a message transmitted between the server node and the at least two multimedia-playing terminal nodes.

6. The multimedia broadcasting system having the multiple-node structure as claimed in claim 5, wherein the at least one relay node stores multimedia terminal messages from the at least two multimedia-playing terminal nodes and doesn't transmit the multimedia terminal messages to the server node.

7. A multimedia broadcasting control method, applied to a multimedia broadcasting system having a multiple-node structure, wherein the multimedia broadcasting system having the multiple-node structure comprises:
  a plurality of nodes, wherein each of the plurality of nodes is coupled to at least one of the plurality of nodes, and the plurality of nodes comprises:
  a plurality of server nodes, wherein each server node is coupled to at least one server node of the plurality of server nodes and provides at least one multimedia content, wherein the server nodes coupled with each other share resources with each other and take partial or entire control of each other; and
  a plurality of multimedia-playing terminal nodes, wherein each multimedia-playing terminal node receives multimedia content transmitted by a server node of the plurality of server nodes and plays the multimedia content, and
wherein the multimedia broadcasting control method comprises:
  transmitting, by a first server node of the plurality of server nodes and via a second server node of the plurality of server nodes which is coupled to the first server node, a first multimedia content to at least one multimedia-playing terminal node controlled by the second server node to make the at least one multimedia-playing terminal node play the first multimedia content,
  wherein the multimedia broadcasting control method further comprises:
  transmitting a message among the plurality of nodes by complying with a transmission protocol; and
  limiting nodes which are able to access the message and nodes which are able to transmit the message according to authority settings of the message, so as to achieve different transmission structures,
  wherein the transmission protocol comprises a key, a transmission source, a transmission target, an identifier and message content, and the message is encrypted using the key,
  wherein the multimedia broadcasting control method further comprises:
  calculating a best path between each node and a target node according to a node connection relationship table of the node;
  setting the key; and
  transmitting the message through the best path, along with the key,
  wherein the multimedia broadcasting system having the multiple-node structure comprises at least one group, each of the at least one group comprises at least one server node of the plurality of server nodes, and the multimedia broadcasting control method further comprises:
  when a group is newly added into the multimedia broadcasting system having the multiple-node structure, setting an address of a third server node of the plurality of server nodes to a node connection relationship table of a server node of the group, transmitting, by the server node of the group, a request for a node connection relationship table to the third server node, and transmitting, by the third server node, a node connection relationship table of the third server to the server node of the group to make the server node of the group obtain capability of communication with the plurality of server nodes.

8. The multimedia broadcasting control method as claimed in claim 7, further comprising:
  transmitting, by the first server node, a request for multimedia-playing terminal list to the second server to obtain a list of a plurality of multimedia-playing terminal nodes controlled by the second server node; and
  transmitting, by the first server node, a request for taking control over multimedia-playing terminal nodes to the second server node according to the list and taking control over the at least one multimedia-playing terminal node controlled by the second server node according to a response from the second server node.

9. The multimedia broadcasting control method as claimed in claim 7, further comprising:
  when a multimedia-playing terminal node is added into the multimedia broadcasting system having the multiple-node structure, searching for, by the multimedia-playing terminal node, a third server node of the plurality of server nodes which is the closest to the multimedia-playing terminal node in the multimedia broadcasting system having the multiple-node structure according to a node connection relationship table of the multimedia-playing terminal node, and registering the multimedia-playing terminal node to the third server node to make the multimedia-playing terminal node be controlled by the third server node.

10. The multimedia broadcasting control method as claimed in claim 7, further comprising:
  searching for a node among the plurality of nodes which provides a specific function or service according to a node connection relationship table of a multimedia-playing terminal node of the plurality of multimedia-playing terminal nodes; and
  transmitting a request for the specific function or service to the node to make the multimedia-playing terminal node play multimedia content of the specific function or service.

11. The multimedia broadcasting control method as claimed in claim 7, wherein the plurality of nodes further comprise at least one relay node, the at least one relay node is coupled to a server node of the plurality of server nodes and at least two multimedia-playing terminal nodes of the plurality of multimedia-playing terminal nodes, and the multimedia broadcasting control method further comprises:
  relaying or temporarily storing, by the at least one relay node, a message transmitted between the server node and the at least two multimedia-playing terminal nodes.

12. The multimedia broadcasting control method as claimed in claim 7, further comprising:
  storing multimedia terminal messages from the at least two multimedia-playing terminal nodes to the at least one relay node, and not transmitting the multimedia terminal messages to the server node.

* * * * *